Dec. 30, 1969  R. C. PERSONS  3,486,766
UNIVERSAL SUPPORT FOR A CYCLE SADDLE BRACE
Filed Dec. 7, 1967
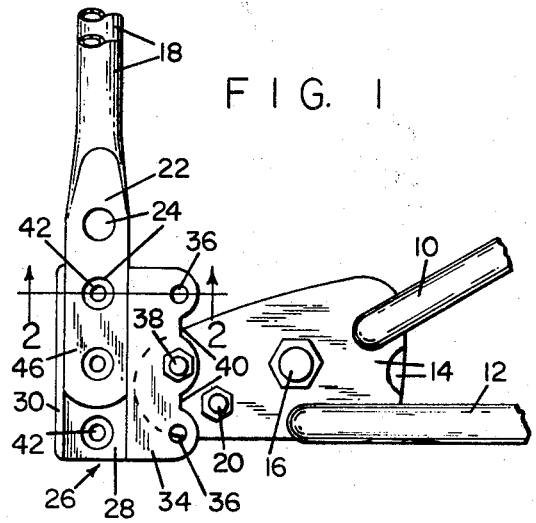
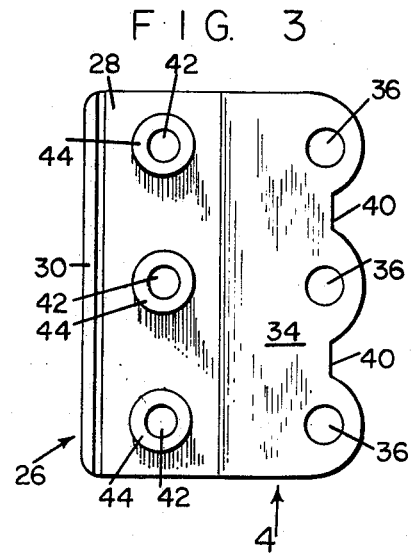
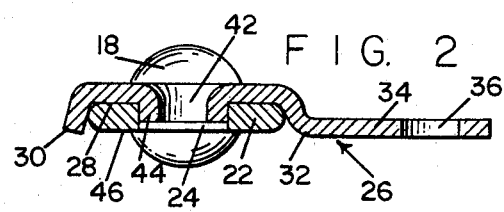
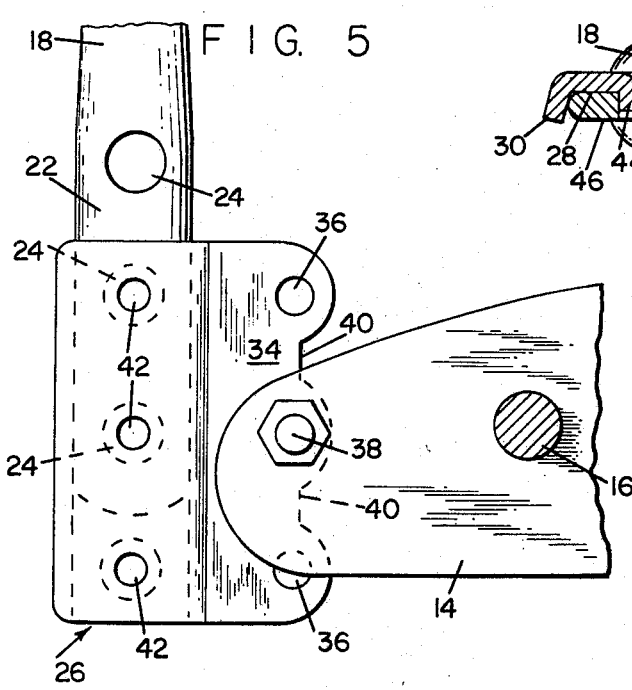
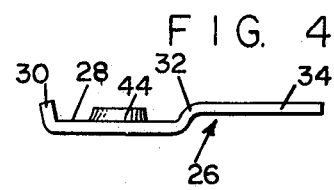
INVENTOR
ROBERT C. PERSONS
BY *Charles R. Fry,*
ATTORNEY

United States Patent Office 3,486,766
Patented Dec. 30, 1969

3,486,766
UNIVERSAL SUPPORT FOR A CYCLE SADDLE BRACE
Robert C. Persons, 72 Commercial St., Worcester, Mass. 01608
Filed Dec. 7, 1967, Ser. No. 688,894
Int. Cl. B62k 19/36, 19/30
U.S. Cl. 280—287                          6 Claims

ABSTRACT OF THE DISCLOSURE

A supporting plate or bracket for attachment to the end plate of a cycle frame on which saddle supports or braces may be adjustably mounted, comprising a pressed plate or the like having several aligned, spaced apertures therein for selective attachment to the end plate in any one of three positions of vertical adjustment, said plate having indentations for the accommodation of extraneous devices also mounted on the end plate, to avoid the same and to allow the supporting plate or bracket to adjustably receive the lower end of a cycle saddle support or brace, said plate or bracket having a channel conformation with a plurality of spaced holes in the bottom of the channel for the reception of bolts adjustably mounting the brace therein and holding the same against motion in any direction.

---

This invention relates to a cycle saddle brace support comprising a plate for adjustable attachment to the end plate of a cycle frame and having edge indentations therein for the avoidance of extraneous parts appearing on certain end plates, and having a plurality of holes therein for vertically adjustable attachment thereto, said plate or bracket having a channel therein for the reception of the flattened lower end of the cycle saddle brace, usually tubular, and providing for attachment thereof to the plate or bracket in upright position where it is incapable of moving in any direction by being located in the channel and through the use of fasteners securing the brace to the plate.

Other objects and advantages of the invention will appear hereinafter.

Reference is to be had to the accompanying drawings in which:

FIG. 1 is a view in elevation with parts broken away illustrating the brace and its support connected to the end plate of a cycle frame;

FIG. 2 is an enlarged section on line 2—2 of FIG. 1;

FIG. 3 is an enlarged view in elevation of the bracket or plate;

FIG. 4 is an edge view looking in the direction of arrow 4 in FIG. 3, and

FIG. 5 is a view similar to FIG. 3 but showing the plate reversed and applied to the end plate at the opposite side of the cycle.

Only so much of the cycle construction is shown as is necessary to disclose the invention to those skilled in the art. The cycle of general construction will have frame members such as at 10 and 12, these being connected with respect to the end plate 14, there being frame members and end plates at either side of the cycle to straddle the rear wheel, not shown, and the axle of the rear wheel is mounted in the end plates as for instance as shown at 16.

In some cases the braces or supports such as at 18 for the cycle saddle, not shown, are mounted directly on the hub 16 and this can be done in cases where there is no interference with the frame members or extraneous attachments to the end plates such as shown at 20. Such attachments may be of any kind and are not necessary to be further disclosed. For this purpose the brace 18 which is tubular is flattened as at 22 and provided with a series of holes 24 for the purpose of fitting over the hub 16 and being secured thereto by the hub nut in the usual manner.

However in many cases this is impossible due to other parts which may be in the way, depending upon the design of the cycle, such parts which may interfere being the ends of the frame parts 10 and 12 or the extraneous device 20, the latter being of many different forms.

In order to provide that the cycle brace 18 can be mounted on an end plate which has projections preventing attachment of the brace directly to the hub 16, as shown in FIG. 1, the plate which is generally indicated at 26 has been provided. This plate is generally flat but has been pressed in the area at 28 to form a channel, best seen in FIG. 4, this channel having an upturned lip 30 at a free edge thereof and an upturned portion at 32 connecting the channel with respect to the portion 34 which is used to secure plate 26 to end plate 14.

The portion of the plate at 34 is provided with a series of aligned, spaced apertures 36, 36 and as shown in FIG. 1 a selected aperture is fitted over a bolt 38 in a hole in end plate 14. It will be seen that any aperture 36 may be aligned with the bolt 38 so that there are three positions of vertical adjustment of plate 26 with respect to the end plates 14. Between the areas that are apertured as at 36 there are indentations 40 for the purpose of avoiding possible obstacles such as the member 20 in FIG. 1 while allowing the plate 26 to be mounted in upright condition on the end plate.

The channel portion of the plate 26 is provided with a series of apertures 42, 42 and in this case the apertures have struck-up, surrounding rims as indicated at 44, see particularly FIGS. 2 and 4, these acting as fillers for holes 24 which have to fit the hub 16 and at the same time receive the proper size of bolt which will extend through the apertures 42 to secure the flattened portion 22 of the brace 18 in the channel portion 28 of plate 26. These fillers or rims do not extend upwardly to the flat surface 46 of the brace 18, see FIG. 2, so that the nuts or washers therefor can contact the flattened portion of the brace and securely maintain the same in position in the channel 28 and this is clearly shown in FIG. 2, although the nut and bolt have been omitted for clarity of illustration.

It will be seen that any of the holes 24 may be aligned with any of the holes 42. It is generally preferable to have at least two bolts, i.e., with the parts in the relative adjustment of flat portion of brace 18 with respect to the channel as shown in FIG. 1, but it is possible to drop brace 18 down the space between the two holes, or to raise it the same amount, and in view of the fact that the plate 26 itself is vertically adjustable it will be seen that there are various adjustments that can be made to the cycle saddle brace with respect to the cycle saddle and the end plates 14.

There is a plate 26 on each end plate 14, i.e., one at each side of the cycle, and the saddle brace includes the two legs, one at each side of the saddle. The structure is therfore duplicated at each side of the cycle and exactly the same plate 26 can be used at either side, as by inverting the plate as shown in FIG. 5.

The plates 26 need not be positioned vertically as shown but may also be located at inclines with respect to the vertical. Often the braces 18 must tilt upwardly to the left in FIGS. 1 and 5 to accommodate certain types of saddles well known in the art.

Having thus described my invention and the advantages thereof, what I claim is:

1. In a cycle having a frame and including end plates with a wheel hub in said end plates, and a brace for a saddle, that improvement which comprises a substantially flat bracket, means for attaching the bracket to an end plate in a position having a portion thereof projecting beyond an edge of the end plate and clearing the hub, means securing the lower end of the saddle brace to the bracket in the portion of the bracket which extends beyond the end plate edge, and means on said bracket engaging the lower end of said cycle saddle brace and preventing the same from tilting in the plane of the bracket.

2. The cycle of claim 1 wherein said last-named means comprises a channel in the bracket having a bottom portion, the lower end portion of the cycle saddle brace being generally flat and substantially fitting in said channel, the means securing the lower end portion of the cycle saddle brace to the bracket comprising fastening means extending through the flat portion of the cycle saddle brace and the bottom portion of the channel.

3. The cycle of claim 1 wherein said last named means comprises a channel having a bottom on the bracket, the lower end portion of the cycle saddle brace being flat and received in said channel in generally upright condition, and means fastening the flat portion of the cycle saddle brace to the bottom of the channel.

4. The cycle of claim 1 wherein said last named means comprises a channel having a bottom on the bracket, the lower end portion of the cycle saddle brace being flat and received in said channel in generally upright condition, and means fastening the flat portion of the cycle saddle brace to the bottom of the channel, said means comprising a fastener extending through corresponding apertures in the flat portion of the cycle saddle brace and the bottom of the channel.

5. The cycle of claim 1 wherein said last named means comprises a channel having a bottom on the bracket, the lower end portion of the cycle saddle brace being flat and received in said channel in generally upright condition, and means fastening the flat portion of the cycle saddle brace to the bottom of the channel, said means comprising a fastener extending through corresponding apertures in the flat portion of the cycle saddle brace and the bottom of the channel, and an outwardly extending rim forming a filler for the corresponding aperture in the flat portion of the cycle saddle brace, for the reception of a fastener of smaller diameter than the diameter of the hub mounted in the end plates.

6. The cycle of claim 1 wherein said bracket is provided with indentations in an edge thereof overlapping the respective end plate, said indentations providing for the prevention of interference between projections on the end plate and the bracket.

References Cited

UNITED STATES PATENTS

| | | | |
|---|---|---|---|
| 1,384,300 | 7/1921 | Buckland. | |
| 1,717,056 | 6/1929 | Mesinger | 280—202 |
| 2,527,431 | 10/1950 | Kutil | 280—293 |
| 2,647,764 | 8/1953 | Anderson | 280—293 |
| 3,408,090 | 10/1968 | Fritz et al. | 280—287 |
| 3,416,837 | 12/1968 | Saunders | 297—195 |

KENNETH H. BETTS, Primary Examiner

U.S. Cl. X.R.

248—295; 280—289; 297—195